US012612893B2

(12) United States Patent
Jensen et al.

(10) Patent No.: US 12,612,893 B2
(45) Date of Patent: Apr. 28, 2026

(54) CONTROLLING A WIND POWER PLANT BASED ON OPERATING COMMANDS RECEIVED FROM A DISTRIBUTED SYSTEM ACROSS A COMMUNICATIONS NETWORK

(71) Applicant: VESTAS WIND SYSTEMS A/S, Aarhus N (DK)

(72) Inventors: Jan Krogh Jensen, Hinnerup (DK); Jacob Barsøe Kjærgaard, Hinnerup (DK); Bruno Andre Lopes Ferreira, Rans (PT)

(73) Assignee: VESTAS WIND SYSTEMS A/S, Aarhus N (DK)

(*) Notice: Subject to any disclaimer, the term of this patent is extended or adjusted under 35 U.S.C. 154(b) by 590 days.

(21) Appl. No.: 18/295,100

(22) Filed: Apr. 3, 2023

(65) Prior Publication Data

US 2023/0313778 A1 Oct. 5, 2023

(30) Foreign Application Priority Data

Apr. 1, 2022 (EP) ..................................... 22166360

(51) Int. Cl.
*G05B 11/00* (2006.01)
*F03D 7/00* (2006.01)

(52) U.S. Cl.
CPC ..................................... *F03D 7/00* (2013.01)

(58) Field of Classification Search
CPC .......... F03D 7/00; F03D 7/0284; F03D 7/047; F03D 7/048; Y02E 10/72; H02J 2300/28; H02J 13/00034; H02J 3/381
See application file for complete search history.

(56) References Cited

U.S. PATENT DOCUMENTS 11,455,642 B1 * 9/2022 Jameson .............. G06Q 20/108
2014/0297206 A1 10/2014 Silverman
(Continued)

FOREIGN PATENT DOCUMENTS

WO 2012015508 A1 2/2012

OTHER PUBLICATIONS

Draft Guide for Cybersecurity of Distributed Energy Resources Interconnected with Electric Power Systems, Mar. 8, 2022 https://ieeexplore.ieee.org/stamp/stamp.jsp?tp=&arnumber=9751215 &tag=1 (Year: 2022).*

(Continued)

*Primary Examiner* — Aleksey Olshannikov
*Assistant Examiner* — Alex Olshannikov
(74) *Attorney, Agent, or Firm* — Patterson + Sheridan, LLP; Gero G. McClellan

(57) ABSTRACT

The invention provides a method for controlling a wind power plant that receive operating command requests via a distributed system comprising a plurality of subsystems each associated with a respective party capable of issuing requests. One subsystem generates a request to operate the wind power plant in accordance with a defined operating command desired by the associated party. The request is broadcast to each of the other subsystems to approve or disapprove the requests. Each subsystem broadcasts to the other subsystems if it approves the request, and each subsystem maintains a database including a record of which subsystems have approved the request. The wind power plant is controlled based on which subsystems have approved the request, where at least one subsystem other than the subsystem that generates the request needs to have approved the request before the plant implements the defined operating command.

18 Claims, 3 Drawing Sheets

(56) References Cited

U.S. PATENT DOCUMENTS

| | | | |
|---|---|---|---|
| 2017/0358929 A1 | 12/2017 | Koeppe et al. | |
| 2019/0163152 A1* | 5/2019 | Worrall | H02J 3/003 |
| 2019/0268319 A1* | 8/2019 | Kurian | G06F 21/64 |
| 2019/0393722 A1* | 12/2019 | Stöcker | H02J 13/00034 |
| 2020/0026318 A1* | 1/2020 | Forbes, Jr. | H02J 3/322 |
| 2020/0028360 A1* | 1/2020 | Heintel | H04L 9/50 |
| 2020/0097950 A1 | 3/2020 | Thompson | |
| 2020/0134743 A1* | 4/2020 | Rentschler | H02J 3/008 |
| 2021/0065317 A1* | 3/2021 | Cali | G06Q 50/18 |
| 2021/0326984 A1* | 10/2021 | Kim | G06Q 40/04 |
| 2021/0350343 A1 | 11/2021 | Gaur et al. | |
| 2022/0368129 A1* | 11/2022 | Saad | H04L 63/08 |
| 2023/0068532 A1* | 3/2023 | Forbes, Jr. | G06Q 30/08 |
| 2023/0361572 A1* | 11/2023 | Matan | G06Q 10/10 |

OTHER PUBLICATIONS

Stefanos Baros, A Consensus Approach to Real-Time Distributed Control of Energy Storage Systems in Wind Farms, Sep. 6, 2017 (Year: 2017).*

Dusan B. Gajic, A Distributed Ledger-Based Automated Marketplace for the Decentralized Trading of Renewable Energy in Smart Grids, Mar. 14, 2022 (Year: 2022).*

European Patent Office, Extended European Search Report for Application 22166360.2-1202 dated Sep. 12, 2022.

* cited by examiner

40

401 — GENERATE REQUEST

402 — TRANSMIT REQUEST TO EACH SUBSYSTEM

403 — PERFORM APPROVAL PROCESS AT EACH SECOND SUBSYSTEM

404 — TRANSMIT APPROVAL TO EACH SUBSYSTEM

405 — STORE RECEIVED APPROVALS FROM ONE OR MORE SECOND SUBSYSTEMS

406 — CONTROL WIND POWER PLANT

CONTROLLING A WIND POWER PLANT BASED ON OPERATING COMMANDS RECEIVED FROM A DISTRIBUTED SYSTEM ACROSS A COMMUNICATIONS NETWORK

TECHNICAL FIELD

The invention relates to controlling a wind power plant and, in particular, to controlling a wind power plant based on operating commands, e.g. setpoints, received from a distributed system across a communications network. Examples of the invention involve an operating command that is generated at one subsystem of a plurality of subsystems of the distributed system being approved or disapproved by each of the other subsystems of the distributed system, maintaining an indisputable record of generated and approved operating commands, and controlling the wind power plant based on which subsystems approved the request.

BACKGROUND

Wind power plants, or wind farms, include a number of wind turbines in the vicinity of one another that are used to produce electricity by capturing energy from wind, e.g. for supply to the grid. Modern wind power plants can receive operating commands, such as setpoints for power production, from different actors, stakeholders or parties that have an interest in operation of the plant. These actors can include customers, utility companies, grid operators, service providers, plant/asset owners, and market traders.

Each of these different actors can have multiple systems or users making decisions on the power production of a wind power plant, or other operational aspects of the plant. Issues can occur if multiple actors impose operating commands on a wind power plant. In particular, it can be difficult to associate a given request to impose an operating command to a particular actor, and so attribute responsibility if the given request is later questioned.

In an illustrative example, if there is a surplus of generator capacity in a wind power plant and prices for delivering power to the grid become negative, i.e. the wind power plant asset owner pays to deliver power to the grid rather than being paid to provide power, then a command sent to produce power in such cases may cause a direct loss to the asset owner, whereas an appropriate setpoint in such cases would be zero. In such a case, if an inappropriate command is sent that causes a direct loss to the asset owner then it will be desired to ascertain who is responsible for this. In another illustrative example, a request to command operation of the wind power plant to cease, e.g. by shutting down wind turbines of the plant, for instance for a defined amount of time, may be sent. This may be to allow scheduled maintenance to be performed at the wind power plant.

There is therefore a need to provide mechanisms to ensure that requests to a wind power plant to implement operating commands from different actors are properly authorised and validated, and that indisputable evidence of the origin, time, etc., of such requests is acquired and retained.

It is against this background to which the present invention is set.

SUMMARY OF THE INVENTION

According to an aspect of the invention there is provided a method for controlling a wind power plant. The wind power plant is configured to receive requests to operate in accordance with one or more operating commands via a distributed system comprising a plurality of subsystems that are in communication via a communications network. The plurality of subsystems comprises a first subsystem associated with the wind power plant and a plurality of second subsystems each associated with a respective party capable of issuing requests for the wind power plant.

The method comprises, at one of the second subsystems: generating a request to operate the wind power plant in accordance with a defined operating command desired by the party associated with said second subsystem; and, transmitting the request from said second subsystem to each of the plurality of subsystems other than said second subsystem via the communications network.

The method comprises, at each of the second subsystems other than said second subsystem: receiving the request from said second subsystem; performing an approval process to determine whether to approve the received request; and, if an outcome of the approval process is to approve the request, transmitting the approval to each of the plurality of subsystems via the communications network.

The method comprises, at each of the plurality of subsystems: receiving the respective approval from each of the second subsystems that approves the request; and, storing, in a database of the respective subsystem, the respective approval for each of the second subsystems that approves the request.

A controller of the wind power plant controls the wind power plant in dependence on which of the second subsystems has approved the request, wherein at least one of the second subsystems other than said second subsystem needs to have approved the request, based on the database of the first subsystem, prior to the wind power plant being controlled to operate in accordance with the defined operating command.

The databases of the respective plurality of subsystems may form part of a distributed ledger.

In each respective database, the received approvals from the respective second subsystems may be stored as a series of cryptographically-linked database entries.

The series of database entries at each respective subsystem may form a blockchain.

In some examples, generating the request at said second subsystem comprises generating an initial database entry comprising the desired operating command, and a timestamp indicating a time at which the initial database entry is generated.

In some examples, at each of the second subsystems other than said second subsystem, if the outcome of the approval process is to approve the request, then the method may comprise: generating a database entry indicating approval of the request and comprising the desired operating command, a timestamp indicating a time at which the database entry is generated, and a cryptographic hash of a most recent entry of a series of database entries, the series starting with the initial database entry and comprising an entry corresponding to each second subsystem that has provided approval of the request; and, updating the series of database entries to include the generated database entry at the end of the series. Transmitting the approval may comprise transmitting the updated series to each of the plurality of subsystems.

The method may comprise, at each of the subsystems, receiving the updated series and replacing a current version of the series stored in the respective database with the updated series.

In some examples, each of the second subsystems other than said second subsystem needs to have approved the request, based on the database of the first subsystem, prior to the wind power plant being controlled to operate in accordance with the defined operating command.

In some examples, if the database of the first subsystem indicates that at least one of the plurality of second subsystems has not provided approval of the request, then the wind power plant may not implement the defined operating command.

In some examples, if the database of the first system indicates that at least one of the second subsystems other than said second subsystem has approved the request, then the method may comprise, at the first subsystem, determining whether to control the wind power plant to implement the defined operating command based on which of the second subsystems other than said second subsystem has approved the request, and the method may comprise controlling the wind power plant in dependence on said determination. The determination may include applying a weighting to each received approval based on which second subsystem provided the respective approval, wherein the determination as to whether to implement the defined operating command may be based on the weighted approvals.

In some examples, if the wind power plant is to be controlled to operate in accordance with the defined operating command, then the method may comprise retrieving the defined operating command from the first subsystem, the retrieval being performed by a further subsystem or server of the wind power plant. The signal indicative of the request may be transmitted to the controller of the wind power plant from the further subsystem or server.

In some examples, performing the approval process at each of the second subsystems other than said second subsystem may comprise executing a respective predefined algorithm to analyse the request relative to one or more predefined criteria of the party of the respective second subsystem.

The predefined criteria may relate to one or more of: a level of revenue associated with operation of the wind power plant at the defined operating command; an impact on balancing a grid to which the wind power plant is connected associated with operation of the wind power plant at the defined operating command; and, a time of planned maintenance work to be performed at the wind power plant.

The defined operating command may be a setpoint. A setpoint may be a state that the wind power plant is aiming to reach. For instance, a setpoint (command, instruction) may define a level of desired/requested power that the wind power plant is producing, or produces over a certain time period (active power production). Setpoints may alternatively relate to other aspects of wind power plant control, e.g. a level of reactive power related to (maintaining) grid stability. One or more controllers of the wind power plant may then determine how to control various aspects of wind power plant operation in order to attain one or more requested setpoints, e.g. by controlling wind turbine rotor blade pitch, controlling wind turbine generator speed, resetting or shutting down one or more wind turbines, etc.

The defined operating command may be to stop/halt or pause operation of the wind turbine.

The parties associated with the second subsystems may each be one of: a utility organisation associated with the wind power plant; a service provider or operator associated with the wind power plant; a trader that trades in a market associated with the wind turbine; and, an owner of the wind power plant.

According to another aspect of the invention there is provided a distributed system comprising a plurality of subsystems that are in communication via a communications network. The plurality of subsystems includes a first subsystem associated with a wind power plant and a plurality of second subsystems each associated with a respective party capable of issuing requests for the wind power plant to operate in accordance with defined operating commands.

The distributed system is configured to, at one of the second subsystems: generate a request to operate the wind power plant in accordance with a defined operating command desired by the party associated with said second subsystem; and, transmit the request from said second subsystem to each of the plurality of subsystems other than said second subsystem via the communications network.

The distributed system is configured to, at each of the second subsystems other than said second subsystem: receive the request from said second subsystem; perform an approval process to determine whether to approve the received request; and, if an outcome of the approval process is to approve the request, transmit the approval to each of the plurality of subsystems via the communications network.

The distributed system is configured to, at each of the plurality of subsystems: receive the respective approval from each of the second subsystems that approves the request; and, store, in a database of the respective subsystem, the respective approval for each of the second subsystems that approves the request.

The distributed system causes the wind power plant to be controlled in dependence on which of the second subsystems has approved the request. At least one of the second subsystems other than said second subsystem needs to have approved the request, based on the database of the first subsystem, prior to the wind power plant being controlled to operate in accordance with the defined operating command.

The distributed system may comprise the wind power plant. A controller of the wind power plant may command the wind power plant to operate in accordance with the defined operating command.

BRIEF DESCRIPTION OF THE DRAWINGS

Examples of the invention will now be described with reference to the accompanying drawings, in which.

DETAILED DESCRIPTION

Figure 1:
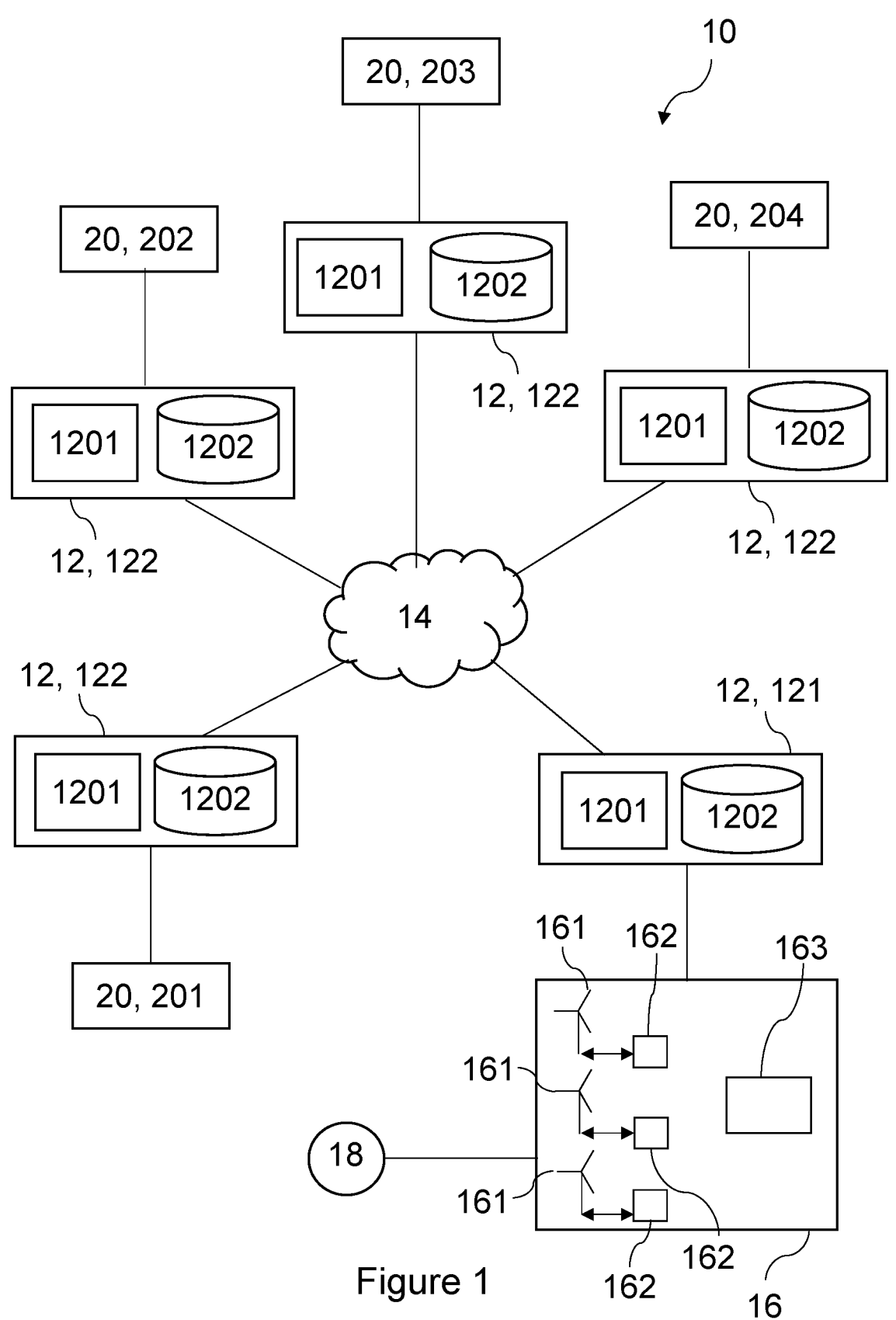
FIG. 1 is a schematic illustration of a distributed system including a plurality of subsystems in communication over a communications network in accordance with an example of the invention.

FIG. 1 illustrates an example of a distributed system 10 including a plurality of subsystems 12. Each subsystem 12 has means 1201, e.g. transmitters/receivers, to allow communication with one another over a communications network 14. Each subsystem 12 also includes a database 1202, or other data storage or memory device, for storing data structures and data or information received from the different subsystems 12 across the network. The communications network 14 is a wide area network such as the internet.

A first one of the subsystems 121 is associated with, and in communication with, a wind power plant or wind farm/park 16. The wind power plant 16 includes a plurality of wind turbines 161 that are for capturing energy from wind flowing past the turbines and for converting the captured energy into electricity or power supplied to the grid 18. The wind power plant 16 includes one or more controllers 162 for controlling operation of the wind turbines 161. This can include controllers for adjusting collective and/or individual pitch of rotor blades of the wind turbines, adjusting the speed of generators of the wind turbines 161, halting/ pausing operation of the wind turbines, etc. The controllers can include controllers located within each wind turbine 161 and/or controllers remote from the wind turbines 161.

The one or more controllers 162 may be in direct com- munication with the first subsystem 121. Alternatively, the one or more controllers 162 may be in communication with the first subsystem 121 via a further subsystem, separate server or plant-level controller 163 of the wind power plant 16.

The wind power plant 16 may be regarded as being part of, or separate from, the distributed system 10.

The remaining (second) subsystems 122 of the plurality of subsystems 12 are each associated with a respective stake- holder of the wind power plant 16. That is, each second subsystem 122 is associated with a respective actor or party that has an interest in operation of the wind power plant 16. Furthermore, each of these parties is capable of issuing requests to the wind power plant 16 to control how the wind power plant 16 operates. For instance, these are requests for the wind power plant 16 to implement one or more operating commands, e.g. setpoints, or other commands such as to stop or pause operation of the wind power plant 16, for instance by shutting down operation of each of the wind turbines 161. The requests are sent via transmission between different subsystems 12 across the communications network 14.

A number of different parties 20 may have an interest in how the wind power plant 16 operates. In the described example, four different types of party or stakeholder are illustrated, each associated with a different one of the subsystems 122. In particular, a wind power plant asset owner 201, a service provider or operator 202 for the wind power plant 16, a utility company 203, and an energy market trader 204 are illustrated. For instance, the asset owner 201 has an interest that the plant 16 operates such that power is supplied to the grid 18 in a profitable manner. The service operator 202 may have an interest that operation of the wind power plant 16 does not impact on scheduled or planned maintenance of some or all of the wind power plant 16. The utility company 203 may have an interest that power pro- duction of the wind power plant 16 supplied to the grid 18 is sufficient to meet demands or requirements in accordance with agreed supply levels, e.g. to customers. The trader 204 may have an interest that operation of the wind power plant 16 is such that agreed transactions between the power suppliers and power providers to customers can be fulfilled, i.e. there is sufficient power production for this purpose. It will be understood that any suitable combination or number of interested parties or stakeholders may be included in the distributed system for providing operational command requests to the wind power plant 16.

The parties or stakeholders that are permitted to transmit requests to control operation of the wind power plant 16 may be pre-approved, i.e. part of an approved list of actors.

In the described example, an operational command in the form of one or more setpoints is considered. In particular, a setpoint that refers to a requested or desired level of power production by the wind power plant 16 supplied to the grid 18, which may be referred to as active power production, is considered. However, it will be understood that the setpoint can relate to various different aspects of operation of the wind power plant 16. For instance, the setpoint may refer to a level of reactive power of the wind power plant 16 related to grid stability. More generally, the operational command may be any command used to control output or other operation of the wind power plant 16, e.g. wind turbine shutdown. It will also be understood that a plurality of operational commands each relating to a different aspect of plant operation may be requested at any given time, or as part of any given request.

In previous systems, a wind power plant may receive and execute a request—to impose an operational command— received via a communications network; however, it can sometimes be difficult to ascertain with complete certainty the origin of the request, i.e. to determine a party or actor that generated and transmitted the request. This risks the possibility that requests are sent by actors not permitted or approved to transmit such requests, or that an actor that is permitted to send such a request nonetheless denies having done so.

The present invention is advantageous in that it increases the security of a distributed system that receives operational command requests, for controlling operation of a wind power plant, from various parties or stakeholders interested in operation of a wind power plant. In particular, this is achieved by ensuring that such requests are properly vali- dated prior to being accepted or implemented by the wind power plant. Specifically, a request generated by one stake- holder of the distributed system needs to be approved or signed off by at least one of, and optionally each of, the other (pre-approved) stakeholders of the distributed system prior to the operating command being implemented or performed by the wind power plant, thereby providing third-party validation of the request.

Examples of the present invention are advantageous in that it may be more readily and reliably established the identity of a party or stakeholder that transmitted an oper- ating command request, and when this occurred. In particu- lar, this is achieved by maintaining an up-to-date record of operating command requests from any source or stakeholder at each of a plurality of subsystems of the distributed system. That is, a history of, or evidence of, operating command requests are stored, maintained and managed collaboratively in a distributed manner.

Examples of the present invention are advantageous in that records of historical operating command requests are indisputable, further ensuring that particular requests can be attributed to particular parties or stakeholders of the wind power plant in an accurate manner. In particular, this is achieved by storing the documentary evidence of previously requested operating commands in a manner that may not be subsequently amended or tampered with, e.g. using a block- chain architecture.

In the example described herein, a system and method is provided by which a party or stakeholder with a vetted interest in the wind power plant 16 can validate that a given operating command was requested or issued by an identified or approved party or actor, where that actor has no means of denying that they issued the operating command. As alluded to above, this is achieved by ensuring that each operating command request is approved or signed (digitally) by an approved and trusted third party—for instance, at least one of, or each of, the other approved subsystems/parties in the distributed system—and by ensuring that a record of each request is stored and maintained in a decentralised manner across the distributed system. Each version of a record or entry at respective subsystems or nodes of the distributed system is designed to be equally valid as the others, i.e. there is no master copy as such. Furthermore, one or more cryptographic methods may be used to ensure that the content of data records or entries is irrefutable and irreversible in time, so that operating command requests attributable to certain parties may not be disputed.

An example is now described in which one of the second subsystems 122 of the distributed system 10 wishes to request a setpoint change in the wind power plant 16. In this example, the setpoint relates to, or defines, a level of desired power production of the wind power plant 16. For instance, the trader (or trading organisation) 204 may desire that the wind power plant operates in a manner that produces a required level or amount of power for the grid 18.

One or more users or systems associated with the relevant party—in this case, the trader 204—may be capable of initiating a request. In particular, the user or system of the trader 204 initiates a request such that the (second) subsystem 122 associated with the trader 204 generates a request to operate the wind power plant 16 in accordance with a defined setpoint.

In the described example, it is required that each of the other (pre-approved or trusted) parties 20 in the distributed system 10 approves the request generated by the trader subsystem 122 before the wind power plant 16 can implement the setpoint. However, it will be understood that in different examples only one of the other parties, a defined minimum number of the other parties, or specific ones of the other parties, may need to approve a request before the wind power plant implements the requested operating command, e.g. setpoint.

The setpoint request is generated as an entry or record in the database 1202 of the trader subsystem 122. In the described example, a blockchain implementation is used for the setpoint request approval process. A blockchain is an append-only data structure including a plurality of ordered data blocks, i.e. a chain of data blocks. Each block of a blockchain typically includes multiple transactions or digital events, a timestamp indicating a time of creation of the respective block, a hash value of the previous block in the (ordered) chain, and a random number that may be used to verify the hash value.

Figure 2:
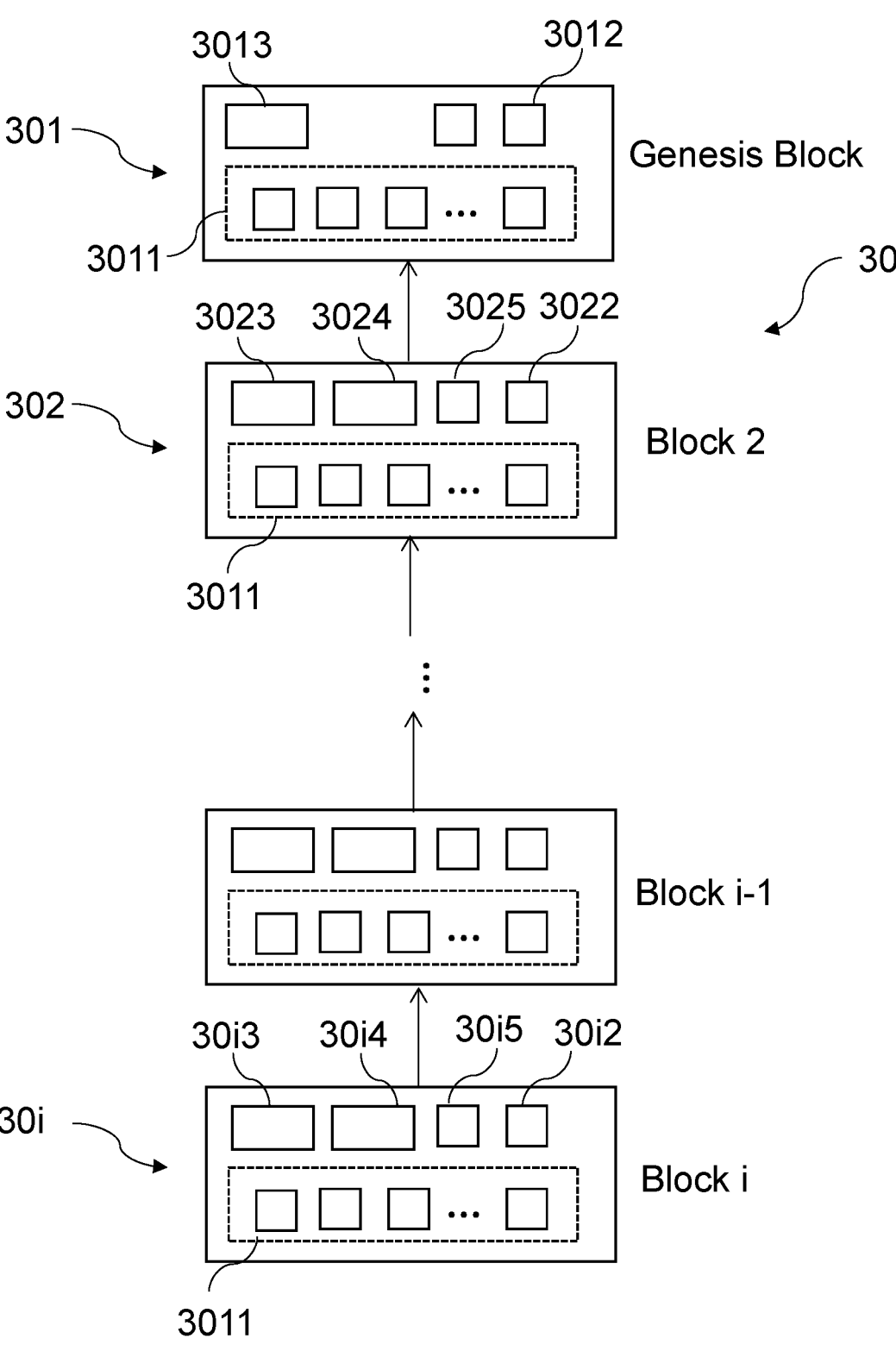
FIG. 2 is a schematic illustration of a data structure stored in each of the subsystems of FIG. 1; and, FIG. 3 illustrates steps of a method performed by the distributed system of FIG. 1 in accordance with an example of the invention.

FIG. 2 schematically illustrates a blockchain data structure 30. The setpoint request generated at the trader subsystem 122 is stored as an initial record or genesis block 301 of the blockchain 30. That is, a new request generated by the subsystem causes a new chain to be started. The initial data record 301 includes details of the setpoint request. In the general case, this can include one or more setpoint values 3011 (or other operational commands) that form the request from the relevant party. This also includes a timestamp 3012 recording details of when the request was created.

Furthermore, the genesis block 301 includes a hash value 3013 of itself. The creation of the genesis block 301 by the trader system 122 to initiate a setpoint request can be regarded implicitly as the trader 204 approving or 'signing' the request.

In the described example, the setpoint request of the trader subsystem 122 needs third-party approval before it can be imposed on, or implemented by, the wind power plant 16. In particular, in the described example each of the other second subsystems 122 in the distributed system 10—i.e. each of the second subsystems 122 other than the trader subsystem 122, in this case—need to approve the request prior to the setpoint(s) of the request being accepted for implementation.

The trader subsystem 122 broadcasts the setpoint request to each of the other nodes or subsystems 12 of the distributed system 10, including the first subsystem 121. In particular, the transmitting means 1201 of the trader subsystem 122 transmits the request—specifically, details of the initial record 301 of the blockchain 30 in this case—via the communications network 14 such that the request is received at the receiving means 1201 of each respective other subsystem 12 of the distributed system 10. It is known to each party a priori which other parties or nodes a setpoint request needs to be broadcast to for approval and/or storage. This may include a list of the parties that are pre-approved in principle to implement setpoint changes or other operational commands at the wind power plant 16.

The setpoint request generated by the trader subsystem 122 (in this example) is received and stored at each of the other subsystems 12, including the first subsystem 121. Each of second subsystems 122 other than the trader subsystem 122 performs an approval process to determine whether to approve the setpoint request. That is, each second subsystem 122 performs an approval process to determine whether the respective associated party 20 approves of the wind power plant 16 being controlled in accordance with the setpoint(s) and/or other operating commands that form the received request.

The approval process will typically be an automated or automatic process, e.g. predefined algorithm or program that checks or compares details of the setpoint request against defined requirements of the respective party 20, which may vary over time. The approval process may include confirming that the setpoint request was generated by a party 20 that is pre-approved to generate such requests. This may involve checking the origin of the received request against a stored list of pre-approved stakeholders or parties 20.

Different parties 20 may have different requirements or interests as to various aspects of wind power plant operation, such as an amount of power produced by the plant 16 for delivery to the grid 18. At a given point in time, each second subsystem 122 of the distributed system 10—in particular, the party 20 associated with the respective subsystem 122—can approve (sign) or disapprove (not sign) an operating command request received from another one of the second subsystems 122.

In the described example, the setpoint request generated by the trader subsystem 122 may relate to a desired amount of power production over a certain time period. This desired level may be in line with agreements or transactions of the trader 204 relating to the purchase of energy from the power generator or producer (at the wind power plant) and sale of energy to consumers. In particular, demand and supply need to be balanced at all times in accordance with agreements.

The setpoint to produce an amount of power requested by the trader 204 may not be in the interest of one or more of the other parties 20. For instance, the requested setpoint may not be in the interest of the utility 203 if the requested setpoint will lead to grid balancing issues. The requested setpoint may not be in the interest of the asset owner 201 if operation in accordance with the setpoint would result in an unacceptable level of revenue for the asset owner 201, e.g. if the asset owner 201 would be paying to provide power to the grid 18 in the event of negative prices. As a further example, the requested setpoint may not be in the interest of the service provider or operator 201 if the requested setpoint involves operating the wind power plant 16 to operate to produce power during a time at which maintenance of the plant 16 is scheduled, where operation of the plant 16 needs to be paused or shut down to perform the maintenance.

At each of the second subsystems 122 other than the second subsystem 122 generating the request, an outcome of the respective approval process is therefore to digitally approve/sign or disapprove/not sign the received request.

When a second subsystem 122 approves the received request, the digital signature to show as much is performed and captured via the generation of a further block or record to be added to the blockchain 30. This provides an indelible and transparent record of the request and approval. In particular, the second subsystem 122 that is first to approve the received request generates a second record or block 302 of the series or blockchain 30 to follow the initial block 301 generated by the second subsystem 122 making the request, in this case the trader subsystem 122. For instance, the asset owner 201 may be the first party to approve/sign the request.

The second block 302 includes the setpoint(s) 3011 being requested, and a timestamp 3022 indicating when the request was signed/approved, e.g. when the second block 302 was created. It may also be deducted which entity approved the request from the generated block. The second block 302 includes a hash value 3023 of itself, i.e. of the second block 302. Furthermore, the second block 302 includes a hash value 3024 of the previous block in the chain or series, i.e. the hash value of the genesis block 301 (Block 0) in this case. The second block 302 also includes a random number 3025 that may be used to verify the hash.

The blockchain 30 stored at the subsystem 122 of the asset owner 201—which is the first party to approve the request—is then updated to include the second block 302, such that the stored blockchain 30 includes the genesis and second blocks 301, 302, where the second block 302 is cryptographically linked to the genesis block 301. The subsystem 122 of the asset owner 201 then transmits the updated blockchain 30 to each of the other subsystems 12—including the first subsystem 121—via the communications network 14 as a way to broadcast or communicate to the other subsystems 12 of the distributed system 10 that the asset owner 201 approves the setpoint request of the trader subsystem 122.

The updated blockchain 30 is received at each of the subsystems 12 other than the subsystem 122 associated with the asset owner, and the updated blockchain 30 is stored in the database 1202 of the respective subsystem 12.

At each second subsystem 122 that performs the approval process, when a respective subsystem 122 approves the request, a respective record or block for the blockchain 30 is generated. As outlined above, the generated block includes details of the setpoint(s) being requested, a timestamp indicating when the block is created, a hash value of the previous block in the blockchain 30, and a random number to verify the hash. The block that is generated at a given second subsystem is appended to the blockchain 30 currently stored in the respective database 1202. For instance, in the present example if the utility 203 is the second party to approve the request, the block generated at the utility subsystem 122 will be appended to the stored blockchain 30 including the first and second blocks 301, 302. The (third) block generated at the utility subsystem 122 will therefore include a hash value of the second block 302, i.e. the previous block in the chain 30. The updated blockchain 30 including the three blocks is then broadcast by the utility subsystem 122 to each of the other subsystems 12, and stored by each of the subsystems 12 as described above.

This updating of the blockchain 30 is repeated until each of the second subsystems 122 that approve of the request have generated and appended a block to the blockchain 30 to digitally sign/approve the request. That is, if i second subsystems 122 (including the second subsystem 122 generating the request) sign the request, then a chain 30 of i blocks is created. The blocks of the chain 30 are in timestamp order.

In a case in which a second subsystem 122 of the distributed system 10 disapproves the received request, the respective second subsystem 122 does not sign the request, meaning that the second subsystem 122 does not generate and append a block to the stored blockchain, and so does not broadcast any update to the blockchain 30 to the other subsystems 12 of the distributed system 10.

As mentioned, in the presently described example each of the (second) subsystems 122 of the distributed system 10 need to approve the setpoint request prior to the setpoint being implemented by the wind power plant. Note that in different examples, only a defined number of the second subsystems, that is fewer than the total number of second subsystems 122 in the distributed system 10, may need to provide approval in order that the setpoint may be implemented, as is mentioned in more detail below.

In the presently described example, if each of these subsystems 122 has approved the request then the blockchain 30 stored at each subsystem 12—including the (first) subsystem 121 associated with the wind power plant 16—will include a block for each (second) subsystem 122.

At the first subsystem 121, if the stored blockchain 30 includes signed blocks from each of the second subsystems 122 then the wind power plant 16 is permitted to implement the setpoint. In the described example, the first subsystem 121 is illustrated as being separate from a power plant controller or server 163, and indeed from controllers 162 of the wind turbines 161. In this case, a signal indicating that the setpoint request has received the necessary (third-party) approval may be transmitted from the first subsystem 121, e.g. using the transmitter 1201, to the plant controller 163 and/or wind turbine controllers 162 to control operation of the plant 16, including controlling the wind turbines 161, in accordance with the defined setpoint of the request. For instance, this could include causing adjustment of the pitch angle of the rotor blades of the wind turbines, controlling generator speed of the wind turbines, etc.

In different examples, the first subsystem 121 may be part of the wind power plant 16, e.g. part of the plant controller 163 or the turbine controllers 162, in which case such a signal may not need to be transmitted. Instead, the relevant controller may simply execute or perform control of the plant 16 in accordance with the setpoint upon approval from each of the second subsystems 122 being received and stored.

At the first subsystem 121, if the stored blockchain 30 does not include signed blocks from each of the second subsystems 122 then the wind power plant 16 is not permitted to implement the setpoint. That is, the wind power plant is not controlled in accordance with the defined setpoint(s) or other operating command(s).

Figure 3:
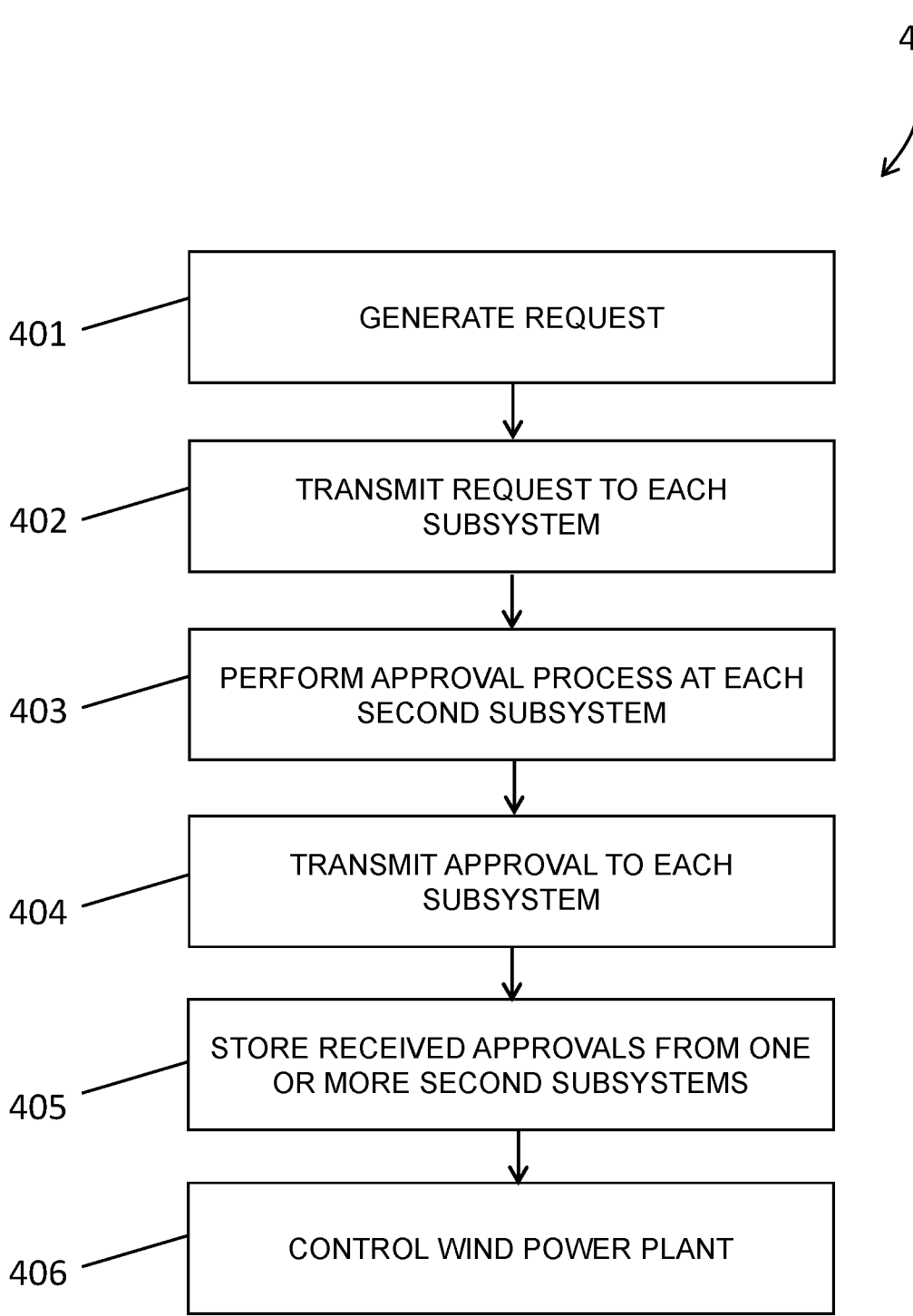

FIG. 3 summarises the steps of a method 40 performed by the distributed system 10 in accordance with examples of the invention. At step 401, at one of the second subsystems 122, a request to operate the wind power plant 16 in accordance with one or more defined operating commands, e.g. setpoints, desired by the party 20 associated with said second subsystem 122 is generated or otherwise made. The request may take the form of a data record or entry for storing in a database, and including details of the request, e.g. one or more defined operating commands that the party 20 desires the plant 16 to implement. At step 402, the request is transmitted by said second subsystem 122 to each of the plurality of subsystems 12—including the first subsystem 121—other than said second subsystem 122 via the communications network 14.

The request is received at each of the subsystems 12 other than the second subsystem 122 that generated and transmitted the request. At step 403 of the method 40, at each of the second subsystems 122 that receives the request, an approval process is performed or executed to determine whether to approve the received request. This may involve a predefined algorithm or routine being executed automatically to determine whether operation of the plant 16 in accordance with the request is in the interests of the respective party 20. A given second subsystem 122 may indicate its respective party's approval of the request by generating a data record and storing it in the database 1202 of the given subsystem 122. The data record may be cryptographically linked to the data record of the request, and any other data records generated to indicate approval of the request by other subsystems 122. In examples in which a blockchain data structure are used, the generated data record to indicate approval by a given second subsystem 122 is in the form of a data block that is appended to the end of the blockchain 30 currently stored in the database 1202, with each block of the chain being cryptographically linked to the previous block in the chain 30.

At step 404 of the method 40, if an outcome of the approval process at a given second subsystem 122 is to approve the request, then the approval is transmitted to each of the plurality of subsystems 12, including the first subsystem 121, via the communications network 14. This may involve transmitting an updated blockchain 30—i.e. updated to include a block indicating the given second subsystem's approval of the request—to each of the other subsystems 12, which at step 405 store the updated blockchain 30 in their respective databases 1202, e.g. by replacing a previously-stored version of the blockchain 30 in the databases. In this way, details of the request and approvals in a data structure, e.g. blockchain, are stored as part of a distributed ledger in which no one subsystem 12 of the distributed system 10 is considered to hold a master copy of the data structure, but rather each subsystem's stored version of the data structure is considered to be as valid as the next one's.

At step 406 of the method 40, the wind power plant 16 is controlled based on the data structure, e.g. blockchain, that has been received and stored at the first subsystem 121. In examples in which third-party approval is needed for a request to be implemented, it can be determined from the stored data structure if sufficient third-party approval has been received. In some examples, only one second subsystem 122 other than the second subsystem 122 that generates the request may need to approve the request for the plant 16 to be permitted to implement the request. In different examples, each of the second subsystems 122 in the distributed system 10 may need to approve the request for the plant 16 to be permitted to implement the request. In further examples, the first subsystem 121 may also need to approve the request.

In some examples, it may not be simply the number of second subsystems 122 that have approved the request that is considered when determining whether the plant 16 can implement the request, but the identity of the particular parties 20 approving or disapproving the request may also be taken into account. For instance, irrespective of the overall number of second subsystems 122 that need to approve the request, a particular one or more subsystems 122 may need to approve the request in order for the plant 16 to be permitted to implement it. It may be that the approval or disapproval of certain subsystems carry more weight than that of certain other subsystems. In such cases, a weighting may be applied to the approval or disapproval of each second subsystem 122 in the distributed system 10, and the first subsystem 121 may perform a determination as to whether the weighting of the received approvals exceeds a defined threshold required in order to permit implementation of the request. The required approvals may need to be received within a defined time period of the request being generated for them to be valid.

If the overall outcome is that the distributed system 10 approves the request, the wind power plant 16 is controlled to operate in accordance with the defined operating command of the request in any suitable manner. The first subsystem 121 may send a signal indicative of the request to one or more of the controllers 162, 163, and the controllers 162, 163 control the plant 16 in accordance with the request. The first subsystem 121 may first need to unpack the stored data structure, e.g. blockchain, to obtain the defined operating commands. Alternatively, if the first subsystem 121 may be part of the plant 16, in which case the plant 16 automatically implements the request upon sufficient approval for the request being received.

Many modifications may be made to the described examples without departing from the scope of the appended claims.

In the described examples, the operating command request generated by one of the (second) subsystems needs to be approved or signed by each of the other subsystems in the distributed system before the wind power plant is controlled to operate in accordance with the operating command. In different examples, however, it may be that only a subset (one or more) of the other subsystems need to approve the request before the wind power plant can implement the setpoint. It may be that a specific subset of trusted subsystems need to provide approval in this case. In this way, an acceptable level of third-party approval—i.e. a party separate from the operating command issuing party—may be achieved. In one example, an operating command request generated by one of the (second) subsystems may need to be approved or signed by the (first) subsystem associated with the wind power plant, and by one other (second) subsystem—which may be a specific one of the subsystems—so as to provide the required third-party approval of the request.

In the above-described and mentioned examples, an operating command request generated by or at one of the subsystems of the distributed subsystem needs third-party approval before the operating command can be implemented by the wind power plant. Approval may be needed from each of, or a subset of, the subsystems in the distributed system other than the subsystem generating the request and the subsystem associated with the wind power plant. In different examples, it may be that third-party approval is not needed prior to an operating command request being implemented, but that the request still needs to be transmitted or broadcast by the subsystem generating the request to each of, or a subset of, the subsystems in the distributed system other than the subsystem generating the request and the subsystem associated with the wind power plant. Details of the request, including its source and timestamp, may then be stored in a secure manner at each of said subsystems, e.g. as a blockchain. In this way, it can readily and independently be validated that a given operational command request was issued by a certain party at a certain time, thereby providing a degree of non-repudiation.

In the above-described example, the (first) subsystem associated with the wind power plant does not need to approve an operating command request in order for the operating command to be implemented by the wind power plant. However, in different examples it may be that the wind power plant also needs to approve a request, e.g. by performing an approval process, prior to the operating command being implemented. For instance, this may involve a block corresponding to the plant's approval being generated and appended at an appropriate point of the blockchain or other data structure broadcast across the distributed system.

In the described examples, a block of the blockchain is generated only if a given subsystem approves a received request, such that generation of the block is in and of itself an indication that the respective subsystem approves the request. In these examples, absence of a block generated by a particular subsystem is indicative that the respective subsystem disapproves the request. In different examples, a block for appending to the blockchain may be generated by each subsystem irrespective of whether the subsystem approves the request, where an indication as to whether the respective subsystem approves or disapproves of the request is included as part of data stored in the block. This could allow confirmation that each subsystem that needs to perform an approval process for a given request has received and considered the request. The first subsystem may then analyse each block of the stored blockchain to identify which parties approve or disapprove the request.

In the described examples, third-party approval of a generated operating command request—by one or more subsystems other than the subsystem generating the request—is needed before the wind power plant is permitted to implement the operating command. In different examples no such third-party approval may be needed. Instead, a request generated by a certain party may automatically be implemented by the wind power plant. However, in such examples the request may still be broadcast to each of the other subsystems in the distributed system, with the request being stored at each subsystem as part of a distributed ledger to provide sufficient non-repudiation if details about transmission of the request (e.g., who, when, etc.) are ever challenged.

The invention claimed is:

1. A method for controlling a wind power plant, the wind power plant being configured to receive requests to operate in accordance with one or more operating commands via a distributed system comprising a plurality of subsystems that are in communication via a communications network, the plurality of subsystems comprising a first subsystem associated with the wind power plant and a plurality of second subsystems each associated with a respective party capable of issuing requests for the wind power plant, the method comprising:

at one of the second subsystems:

generating a request to operate the wind power plant in accordance with a defined operating command desired by the party associated with said second subsystem; and, transmitting the request from said second subsystem to each of the plurality of subsystems other than said second subsystem via the communications network;

at each of the second subsystems other than said second subsystem:

receiving the request from said second subsystem;

performing an approval process to determine whether to approve the received request; and, when an outcome of the approval process is to approve the request, transmitting the approval to each of the plurality of subsystems via the communications network;

at each of the plurality of subsystems:

receiving the respective approval from each of the second subsystems that approves the request; and, storing, in a database of the respective subsystem, the respective approval for each of the second subsystems that approves the request; and, a controller of the wind power plant controlling the wind power plant in dependence on which of the second subsystems has approved the request, wherein at least one of the second subsystems other than said second subsystem needs to have approved the request, based on the database of the first subsystem, prior to the wind power plant being controlled to operate in accordance with the defined operating command.

2. The method according to claim 1, wherein the databases of the respective plurality of subsystems form part of a distributed ledger.

3. The method according to claim 1, wherein, in each respective database, the received approvals from the respective second subsystems are stored as a series of cryptographically-linked database entries.

4. The method according to claim 3, wherein the series of database entries at each respective subsystem forms a blockchain.

5. The method according to claim 3, wherein generating the request at said second subsystem comprises generating an initial database entry comprising the desired operating command, and a timestamp indicating a time at which the initial database entry is generated.

6. The method according to claim 5, wherein, at each of the second subsystems other than said second subsystem, if the outcome of the approval process is to approve the request, then the method comprises:

generating a database entry indicating approval of the request and comprising the desired operating command, a timestamp indicating a time at which the database entry is generated, and a cryptographic hash of a most recent entry of a series of database entries, the series starting with the initial database entry and comprising an entry corresponding to each second subsystem that has provided approval of the request; and, updating the series of database entries to include the generated database entry at an end of the series, wherein transmitting the approval comprises transmitting the updated series to each of the plurality of subsystems.

7. The method according to claim 6, the method comprising, at each of the subsystems, receiving the updated series and replacing a current version of the series stored in the respective database with the updated series.

8. The method according to claim 1, wherein each of the second subsystems other than said second subsystem needs to have approved the request, based on the database of the first subsystem, prior to the wind power plant being controlled to operate in accordance with the defined operating command.

9. The method according to claim 1, wherein if the database of the first subsystem indicates that at least one of the second subsystems other than said second subsystem has approved the request, then the method comprises, at the first subsystem, determining whether to control the wind power plant to implement the defined operating command based on which of the second subsystems other than said second subsystem has approved the request, and the method comprising controlling the wind power plant in dependence on said determination.

10. The method according to claim 1, wherein performing the approval process at each of the second subsystems other than said second subsystem comprises executing a respective predefined algorithm to analyse the request relative to one or more predefined criteria of the party of the respective second subsystem.

11. The method according to claim 10, wherein the predefined criteria relate to one or more of:

a level of revenue associated with operation of the wind power plant at the defined operating command;

an impact on balancing a grid to which the wind power plant is connected associated with operation of the wind power plant at the defined operating command; and, a time of planned maintenance work to be performed at the wind power plant.

12. The method according to claim 1, wherein the defined operating command is a setpoint.

13. The method according to claim 1, wherein the parties associated with the second subsystems are each one of:

a utility organisation associated with the wind power plant;

a service provider or operator associated with the wind power plant;

a trader that trades in a market associated with a wind turbine; and, an owner of the wind power plant.

14. A distributed system comprising a plurality of subsystems that are in communication via a communications network, the plurality of subsystems including a first subsystem associated with a wind power plant and a plurality of second subsystems each associated with a respective party capable of issuing requests for the wind power plant to operate in accordance with defined operating commands, the distributed system being configured to:

at one of the second subsystems:

generate a request to operate the wind power plant in accordance with a defined operating command desired by the party associated with said second subsystem; and, transmit the request from said second subsystem to each of the plurality of subsystems other than said second subsystem via the communications network;

at each of the second subsystems other than said second subsystem:

receive the request from said second subsystem;

perform an approval process to determine whether to approve the received request; and, when an outcome of the approval process is to approve the request, transmit the approval to each of the plurality of subsystems via the communications network;

at each of the plurality of subsystems:

receive the respective approval from each of the plurality of second subsystems that approves the request; and, store, in a database of the respective subsystem, the respective approval for each of the plurality of second subsystems that approves the request; and, cause the wind power plant to be controlled in dependence on which of the second subsystems has approved the request, wherein at least one of the second subsystems other than said second subsystem needs to have approved the request, based on the database of the first subsystem, prior to the wind power plant being controlled to operate in accordance with the defined operating command.

15. The distributed system according to claim 14, wherein the databases of the respective plurality of subsystems form part of a distributed ledger.

16. The distributed system according to claim 14, wherein, in each respective database, the received approvals from the respective second subsystems are stored as a series of cryptographically-linked database entries.

17. The distributed system according to claim 16, wherein the series of database entries at each respective subsystem forms a blockchain.

18. A system, comprising:

a wind power plant, comprising a plurality of wind turbines; and a distributed system, comprising a plurality of subsystems that are in communication via a communications network, the plurality of subsystems including a first subsystem associated with a wind power plant and a plurality of second subsystems each associated with a respective party capable of issuing requests for the wind power plant to operate in accordance with defined operating commands, the distributed system being configured to:

at one of the second subsystems:

generate a request to operate the wind power plant in accordance with a defined operating command desired by the party associated with said second subsystem; and transmit the request from said second subsystem to each of the plurality of subsystems other than said second subsystem via the communications network;

at each of the second subsystems other than said second subsystem:

receive the request from said second subsystem;

perform an approval process to determine whether to approve the received request; and when an outcome of the approval process is to approve the request, transmit the approval to each of the plurality of subsystems via the communications network;

at each of the plurality of subsystems:

receive the respective approval from each of the plurality of second subsystems that approves the request; and store, in a database of the respective subsystem, the respective approval for each of the plurality of second subsystems that approves the request; and cause the wind power plant to be controlled in dependence on which of the second subsystems has approved the request, wherein at least one of the second subsystems other than said second subsystem needs to have approved the request, based on the database of the first subsystem, prior to the wind power plant being controlled to operate in accordance with the defined operating command.

\* \* \* \* \*